(12) United States Patent
Kondo et al.

(10) Patent No.: US 9,440,514 B2
(45) Date of Patent: Sep. 13, 2016

(54) VEHICLE AIR-CONDITIONING SYSTEM

(75) Inventors: Toshihisa Kondo, Tokyo (JP); Nobuya Nakagawa, Tokyo (JP); Hideki Suetake, Tokyo (JP); Masatoshi Morishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 729 days.

(21) Appl. No.: 13/258,928

(22) PCT Filed: Feb. 24, 2010

(86) PCT No.: PCT/JP2010/052862
§ 371 (c)(1),
(2), (4) Date: Sep. 22, 2011

(87) PCT Pub. No.: WO2011/016264
PCT Pub. Date: Feb. 10, 2011

(65) Prior Publication Data
US 2012/0011869 A1    Jan. 19, 2012

(30) Foreign Application Priority Data
Aug. 7, 2009   (JP) ................................. 2009-184728

(51) Int. Cl.
*F25B 29/00*   (2006.01)
*B60H 1/32*   (2006.01)
(Continued)

(52) U.S. Cl.
CPC .............. *B60H 1/3204* (2013.01); *B60H 1/22* (2013.01); *B60H 1/2225* (2013.01); *B60H 1/3213* (2013.01); *F25B 5/02* (2013.01); *F25B 2400/16* (2013.01)

(58) Field of Classification Search
CPC .... B60H 1/3204; B60H 1/22; B60H 1/2225; B60H 1/3213; F25B 2400/16; F25B 5/02

USPC ........................... 62/160, 173, 175, 199, 200
See application file for complete search history.

(56) References Cited

U.S. PATENT DOCUMENTS 3,928,984 A * 12/1975 Nickell ......................... 62/196.3
3,984,224 A * 10/1976 Dawkins .............. B60H 1/3204
                                                                     62/236

(Continued)

FOREIGN PATENT DOCUMENTS

EP   1 504 934 A2   2/2005
FR   2 897 016 A1   8/2007

(Continued)

OTHER PUBLICATIONS

Extended European Search Report dated Dec. 13, 2012, issued in corresponding European Patent Application No. 10806264.7.

(Continued)

*Primary Examiner* — Allen Flanigan
*Assistant Examiner* — Kun Kai Ma
(74) *Attorney, Agent, or Firm* — Westerman, Hattori, Daniels & Adrian, LLP

(57)   ABSTRACT

A vehicle air-conditioning system (1) includes an HVAC unit (2) in which a first refrigerant evaporator (7) and a second refrigerant condenser (8) are disposed in an air channel (6) communicating with a vehicle interior space; and a heat pump cycle (3) in which a refrigerant compressor (9), a refrigerant switching device (10), a first refrigerant condenser (11) that exchanges heat with the outside air, a first expansion valve (14), and a first refrigerant evaporator (7) are connected in sequence and in which the second refrigerant condenser (8) is connected in parallel with the first refrigerant condenser (11) via the refrigerant switching device (10). An exhaust-heat recovery circuit (23) equipped with a second refrigerant evaporator (18) disposed in a ventilation channel (19) from the vehicle interior and a second expansion valve (17) is connected in parallel with the first expansion valve (14) and the first refrigerant evaporator (7) of the heat pump cycle (3).

13 Claims, 9 Drawing Sheets

(51) Int. Cl.
 B60H 1/22 (2006.01)
 F25B 5/02 (2006.01)

(56) References Cited

U.S. PATENT DOCUMENTS

| | | | | |
|---|---|---|---|---|
| 5,265,668 | A | * | 11/1993 | Fisher .................. 165/42 |
| 5,586,448 | A | * | 12/1996 | Ikeda ............... B60H 1/00392 62/156 |
| 5,899,086 | A | * | 5/1999 | Noda et al. .................. 62/244 |
| 6,125,643 | A | * | 10/2000 | Noda et al. ................. 62/196.4 |
| 6,138,466 | A | * | 10/2000 | Lake et al. .................... 62/199 |
| 6,293,123 | B1 | * | 9/2001 | Iritani ............... B60H 1/3205 62/197 |
| 6,314,750 | B1 | * | 11/2001 | Ishikawa ........... B60H 1/00921 62/129 |
| 6,430,951 | B1 | * | 8/2002 | Iritani ............... B60H 1/00021 62/160 |
| 2003/0037562 | A1 | * | 2/2003 | Honda ............... B60H 1/00907 62/324.1 |
| 2003/0140643 | A1 | * | 7/2003 | Yoshimura ................... 62/186 |
| 2004/0055318 | A1 | * | 3/2004 | Hirota .......................... 62/222 |
| 2004/0074246 | A1 | * | 4/2004 | Kurata ............... B60H 1/00328 62/196.4 |
| 2004/0089004 | A1 | * | 5/2004 | Ogiso ............... B60H 1/00064 62/203 |
| 2004/0129012 | A1 | * | 7/2004 | Feuerecker ......... B60H 1/00914 62/278 |
| 2004/0134217 | A1 | * | 7/2004 | Itoh .................. B60H 1/00392 62/324.1 |
| 2005/0132731 | A1 | * | 6/2005 | Nakamura ........... B60H 1/3205 62/160 |
| 2006/0005557 | A1 | * | 1/2006 | Takano ............. B60H 1/00878 62/238.6 |
| 2006/0248906 | A1 | * | 11/2006 | Burk .................. B60H 1/00914 62/160 |
| 2007/0243808 | A1 | * | 10/2007 | Mathur et al. ................... 454/75 |
| 2009/0020620 | A1 | * | 1/2009 | Douarre ............. B60H 1/00278 237/12.3 R |
| 2009/0113913 | A1 | | 5/2009 | Esaki |
| 2009/0205353 | A1 | * | 8/2009 | Takahashi ........... B60H 1/00899 62/324.1 |

FOREIGN PATENT DOCUMENTS

| | | | |
|---|---|---|---|
| GB | 1063622 | A * | 3/1967 |
| JP | 6-135219 | A | 5/1994 |
| JP | 06-206439 | B2 | 7/1994 |
| JP | 7-329544 | A | 12/1995 |
| JP | 8-058358 | A | 3/1996 |
| JP | 8-091041 | A | 4/1996 |
| JP | 08258545 | A * | 10/1996 |
| JP | 11-042934 | A | 2/1999 |
| JP | 11-170849 | A | 6/1999 |
| JP | 2006-327427 | A | 12/2006 |
| JP | 2009-023373 | A | 2/2009 |
| JP | 2009-113610 | A | 5/2009 |
| JP | 2009-121390 | A | 6/2009 |
| JP | 2009-149288 | A | 7/2009 |

OTHER PUBLICATIONS

Communication under Rule 71(3) EPC issued Jul. 3, 2013, for European Application No. 10806264.7 (7 pages).
International Search Report of PCT/JP2010/052862, mailing date Mar. 23, 2010.

* cited by examiner

VEHICLE AIR-CONDITIONING SYSTEM

TECHNICAL FIELD

The present invention relates to a vehicle air-conditioning system suitable for air conditioning of electric vehicles, etc.

BACKGROUND ART

Air-conditioning systems used in electric vehicles cannot perform a heating operation using combustion exhaust heat from engine cooling water etc. because they are not equipped with an engine. Although exhaust heat from a driving motor, a battery, etc. substituting for an engine can be used, the amount of exhaust heat is so small that a heating system using only exhaust heat as a heat source cannot be established. On the other hand, although a heating system using an electric heater is conceivable, this has the problem of significantly decreasing the driving mileage of the vehicle because power consumption for heating is large relative to the battery capacity.

Thus, a heat pump system equipped with an electric compressor has been considered as an air-conditioning system for electric vehicles. However, a reverse-cycle heat pump in which a refrigerant circuit is switched to use a condenser as an evaporator and an evaporator as a condenser during heating has some problems: at a low outside air temperature, the condenser, which is installed outside the vehicle interior, needs a defrosting operation (during heating, it functions as an evaporator), the heating capacity is insufficient, a dehumidifying operation is impossible, windows fog up when switching between cooling and heating, and so on.

Furthermore, with the foregoing reverse-cycle heat pump, in the case of a heating operation under low outside air temperature conditions, the refrigerant evaporation action of the evaporator (which functions as a condenser during cooling) installed outside the vehicle interior changes considerably, which may cause a liquid slugging operation when starting up or an abnormal low pressure operation, exerting an excessive load on the compressor, thus causing damage to the compressor. To prevent the occurrence of such situations, an accumulator or intake-refrigerant pressure detecting means is disposed at the intake side of the compressor; however, this has the problems of complicating the system and increasing the cost.

Therefore, various improvements have been proposed in the related art; for example, the use of not only exhaust heat from a driving motor including an inverter and a battery, or ventilation exhaust heat from a vehicle interior, but also an electric heater or a combustion heater serving as a heat source for heating has been considered because such exhaust heat has insufficient capacity or it takes much time until the exhaust heat can be used (for example, refer to Patent Literatures 1, 2, and 3).

Furthermore, an approach has been proposed in which a positive temperature coefficient heater (PTC heater) is disposed upstream of a refrigerant evaporator or downstream of a second refrigerant condenser in a heating ventilation and air conditioning unit (HVAC unit) using a heat pump system, where it is used as an auxiliary heat source for heating (for example, refer to Patent Literatures 4 and 5).

CITATION LIST

Patent Literature

{PTL 1} Japanese Unexamined Patent Application, Publication No. Hei 7-329544 (see FIG. 1)
{PTL 2} Japanese Unexamined Patent Application, Publication No. 2009-23373 (see FIG. 1)
{PTL 3} The Publication of Japanese Patent No. 3321871 (see FIGS. 1 to 3)
{PTL 4} Japanese Unexamined Patent Application, Publication No. Hei 8-58358 (see FIG. 1)
{PTL 5} Japanese Unexamined Patent Application, Publication No. Hei 8-91041 (see FIGS. 1 to 2)

SUMMARY OF INVENTION

Technical Problem

However, as shown in Patent Literatures 1 and 2, the approach in which an exhaust heat recovery cycle, which is a separate system from the heat pump cycle, is provided to recover exhaust heat has the problems of complicating the circuit structure, thus increasing the number of components, which increases the size of the apparatus, thus not only reducing the ease of installation in vehicles but also significantly increasing the system cost. Furthermore, the approach disclosed in Patent Literature 3 is configured to recover ventilation exhaust heat with the heat pump cycle but has a problem in that a dehumidifying operation using the heat pump is impossible.

Furthermore, the approach disclosed in Patent Literatures 4 and 5 has a system configuration using a PTC heater in combination but a heating operation using exhaust heat is impossible, meaning that it cannot prevent a heat source shortage at a low outside air temperature, and thus, a high-efficiency heating operation cannot be achieved. Furthermore, the high degree of utilization of the PTC heater inevitably increases the power consumption for heating relative to the battery capacity, thus decreasing the driving mileage of vehicles.

The present invention is made in consideration of such circumstances, and an object thereof is to provide a vehicle air-conditioning system suitable for electric vehicles in which exhaust heat can be recovered with a refrigerant, which is made compact and reduced in cost, and in which the problems of a defrosting operation required for the first heat exchanger disposed outside the vehicle interior, a heat source shortage, a dehumidifying operation, window fogging at switching between cooling and heating, and so on can be solved.

Solution to Problem

To solve the above problems, a vehicle air-conditioning system of the present invention adopts the following solutions.

A vehicle air-conditioning system according to the present invention comprises an HVAC unit configured to blow out an airflow whose temperature is controlled by a first refrigerant evaporator and a second refrigerant condenser disposed in an air channel communicating with a vehicle interior space; and a heat pump cycle in which a refrigerant compressor, a refrigerant switching device for switching the circulating direction of a refrigerant, a first refrigerant condenser that condenses the refrigerant by exchanging heat with outside air, a first expansion valve, and the first refrigerant evaporator are connected in this order and in which the second refrigerant condenser is connected in parallel with the first refrigerant condenser via the refrigerant switching device. In the heat pump cycle, an exhaust-heat recovery circuit, equipped with a second refrigerant evaporator disposed in a ventilation channel from the vehicle interior for recovering exhaust heat and a second expansion valve, is connected in parallel with the first expansion valve and the first refrigerant evaporator.

According to the present invention, an exhaust-heat recovery circuit equipped with a second refrigerant evaporator disposed in a ventilation channel for recovering exhaust heat and a second expansion valve is connected in parallel with a first expansion valve and a first refrigerant evaporator of a heat pump cycle configured to include a first refrigerant evaporator and a second refrigerant condenser disposed in the air channel of an HVAC unit communicating with the vehicle interior space. Accordingly, for cooling, a cooling operation can be performed using a cooling cycle in which the first refrigerant condenser is used as a condenser, and the first refrigerant evaporator of the HVAC unit is used as an evaporator; in a situation where a dehumidifying operation is needed, such as intermediate seasons, a dehumidifying operation can be performed using a dehumidifying cycle in which the second refrigerant condenser of the HVAC unit is used as a condenser and the first refrigerant evaporator is used as an evaporator; and for heating, a high-efficiency, high-capacity heating operation using ventilation exhaust heat as a heat source can be performed using a heating cycle in which the second refrigerant condenser of the HVAC unit is used as a condenser, and the second refrigerant evaporator for recovering exhaust heat disposed in the ventilation channel is used as an evaporator. Accordingly, this can simplify the circuit configuration and considerably reduce the number of components, making the system compact as compared with a system equipped with an exhaust heat recovery cycle in a separate system, thus improving the ease of installation in vehicles and reducing the cost. Furthermore, unlike a heat pump that absorbs heat from outside air, the need for a defrosting operation of the first refrigerant condenser disposed outside the vehicle interior can be nearly eliminated at a low outside air temperature, which can increase the heating efficiency and prevent the need for an operation using the evaporator installed outside the vehicle interior, which stabilizes the evaporation action of the evaporator, thus eliminating the need to install an accumulator and intake-refrigerant pressure detecting means, which makes the system compact and achieves a low cost. Furthermore, in a situation where a dehumidifying operation is needed, such as intermediate seasons, a dehumidifying operation can also be achieved using the heat pump cycle.

In the vehicle air-conditioning system of the present invention, preferably, a first PTC heater for heating air is provided in the air channel upstream of the first refrigerant evaporator and/or downstream of the second refrigerant condenser of the HVAC unit.

With this configuration, since a first PTC heater for heating air is provided in the air channel upstream of the first refrigerant evaporator and/or downstream of the second refrigerant condenser of the HVAC unit, in a situation in which the heating capacity is insufficient, for example, at a low outside air temperature, at the start of heating, or when the window is fogged, the first PTC heater is temporarily operated at the same time as the heat pump is operated to increase the blown air temperature, thereby compensating for the shortage of the heating capacity. This allows the necessary maximum heating capacity to be sufficiently ensured and high-efficiency operation to be achieved by reducing the degree of utilization of the first PTC heater as compared with a heating operation using an electric heater as the main heat source, thereby preventing a decrease in vehicle driving mileage due to an increase in the power consumption for heating.

In the above vehicle air-conditioning system, preferably, at the start of heating, the first PTC heater is operated to start a heating operation in a recirculation air intake mode or an outside and inside air intake mixing mode.

With this configuration, at the start of heating, the first PTC heater provided in the air channel of the HVAC unit is operated to start a heating operation a recirculation air intake mode or an outside and inside air intake mixing mode. This allows heating to be started immediately even at a low outside air temperature and to make up for a shortage in capacity, thereby ensuring the necessary heating capacity. Accordingly, a heating operation can be immediately started irrespective of the outside air temperature, and the blowing air temperature can be increased early in the recirculation air intake mode or the outside and inside air intake mixing mode, thus improving the warm-up performance in heating.

Furthermore, in the vehicle air-conditioning system of the present invention, preferably, a second PTC heater for heating air is provided upstream of the second refrigerant evaporator in the ventilation channel.

With this configuration, since a second PTC heater for heating air is provided upstream of the second refrigerant evaporator in the ventilation channel, even if the temperature of the vehicle interior is low and thus exhaust heat cannot be recovered from the ventilation air to be discharged outside the vehicle, a high-capacity, high-efficiency heating operation can be performed by the heat pump cycle in which the second refrigerant evaporator in the ventilation channel is used as an evaporator and the second refrigerant condenser in the HVAC unit is used as a condenser by working the second PTC heater and driving the refrigerant compressor at the same time. This allows a heating operation to be immediately started irrespective of the outside air temperature, thus improving the warm-up performance in heating.

In the above vehicle air-conditioning system, preferably, at the start of heating, the second PTC heater is operated to start a heating operation in a recirculation air intake mode or an outside and inside air intake mixing mode.

With this configuration, at the start of heating, the second PTC heater disposed in the ventilation channel is operated to start a heating operation in a recirculation air intake mode or an outside and inside air intake mixing mode. This allows heating to be started immediately even at a low outside air temperature and to make up for a shortage in capacity, thereby ensuring the necessary heating capacity. Accordingly, a heating operation can be immediately started irrespective of the outside air temperature, and the blowing air temperature can be increased early in the recirculation air intake mode or the outside and inside air intake mixing mode, thus improving the warm-up performance in heating.

Preferably, the above vehicle air-conditioning system further comprises a temperature sensor configured to detect the surface temperature of the second refrigerant evaporator or the blowing air temperature of air that has passed through the second refrigerant evaporator, wherein when the temperature detected by the temperature sensor falls below a predetermined temperature, the output of the second PTC heater is increased, or the rotational speed of the refrigerant compressor is decreased.

With this configuration, if the surface temperature of the second refrigerant evaporator or the blowing air temperature of air that has passed through the second refrigerant-evaporator, detected by the temperature sensor, is lower than a predetermined temperature at which, for example, frosting of the second refrigerant evaporator may occur, in the case where a sufficient heating capacity is required, as at the start of heating at a low outside air temperature, the output of the second PTC heater is increased. Accordingly, this can prevent frosting of the second refrigerant evaporator with the second PTC heater while ensuring the necessary heating capacity without decreasing the rotational speed of the refrigerant compressor, thereby reliably preventing a decrease in the capacity of the second refrigerant evaporator and damage to the refrigerant compressor due to high-pressure-ratio operation or liquid slugging operation.

On the other hand, in the case where the temperature of air blown from the air channel in the HVAC unit is high enough, and thus, it is determined that the heating capacity is sufficient, the rotational speed of the refrigerant compressor is decreased provided that the surface temperature of the second refrigerant evaporator or the blowing air temperature of air that has passed through the second refrigerant evaporator, detected by the temperature sensor, is lower than a predetermined temperature at which, for example, frosting of the second refrigerant evaporator may occur. This can prevent frosting of the second refrigerant evaporator, thereby reliably preventing a decrease in the capacity of the second refrigerant evaporator and damage to the refrigerant compressor due to high-pressure-ratio operation, or liquid slugging operation. At that time, since the rotational speed of the refrigerant compressor can be decreased without increasing the output of the second PTC heater, the power consumption for heating can be reduced relative to the battery capacity, and thus, a decrease in the driving mileage of the vehicle can be reduced to the minimum.

In the above vehicle air-conditioning system, preferably, the output of the second PTC heater is set to a minimum required output so that the temperature detected by the temperature sensor does not fall below the predetermined temperature.

With this configuration, since the output of the PTC heater can be as low as possible in the range in which frosting of the second refrigerant evaporator can be prevented, the power consumption for heating can be reduced relative to the battery capacity of the vehicle, and thus, a decrease in the driving mileage of the vehicle can be reduced as much as possible.

Preferably, the above vehicle air-conditioning system further comprises a low-pressure sensor for detecting the pressure at the low-pressure side of the refrigerant compressor, wherein when the pressure detected by the low-pressure sensor falls below a predetermined pressure, the output of the second PTC heater is increased, or the rotational speed of the refrigerant compressor is decreased.

With this configuration, if the pressure at the low pressure side of the refrigerant compressor detected by the low-pressure sensor falls below a predetermined pressure at which, for example, high-compression-ratio operation or liquid slugging operation of the refrigerant compressor may occur, in the case where a heating capacity like that at the start of heating at a low outside air temperature is required, the output of the second PTC heater is increased. Accordingly, this can prevent frosting of the second refrigerant evaporator with the second PTC heater while ensuring the necessary heating capacity without decreasing the rotational speed of the refrigerant compressor and can prevent the pressure at the low-pressure side of the refrigerant compressor from falling below the predetermined pressure, thereby reliably preventing high-pressure-ratio operation or liquid slugging operation of the refrigerant compressor.

On the other hand, in the case where the temperature of air blown from the air channel in the HVAC unit is high enough, and thus, it is determined that the heating capacity is sufficient, if the pressure at the pressure at the low-pressure side of the refrigerant compressor detected by the low-pressure sensor is lower than a predetermined pressure at which, for example, high-pressure-ratio operation or liquid slugging operation of the refrigerant evaporator may occur, the rotational speed of the refrigerant compressor is decreased. This can prevent frosting of the second refrigerant evaporator, thereby preventing high-pressure-ratio operation or liquid slugging operation of the refrigerant evaporator. At that time, since the rotational speed of the refrigerant compressor can be decreased without increasing the output of the second PTC heater, the power consumption for heating can be reduced relative to the battery capacity, and thus, a decrease in the driving mileage of the vehicle can be reduced to the minimum.

In the above vehicle air-conditioning system, preferably, the output of the second PTC heater is set to a minimum required output so that the pressure detected by the low-pressure sensor does not fall below the predetermined pressure.

With this configuration, since the output of the PTC heater can be as low as possible in the range in which high-compression-ratio operation or liquid slugging operation of the refrigerant compressor can be prevented, the power consumption for heating can be reduced relative to the battery capacity of the vehicle, and thus, a decrease in the driving mileage of the vehicle can be reduced as much as possible.

In the above vehicle air-conditioning system, preferably, the second PTC heater is disposed away from a location vertically below the second refrigerant evaporator.

With this configuration, because the PTC heater is disposed upstream of the second refrigerant evaporator and away from a location vertically below the second refrigerant evaporator, even if condensation or frost occurs on the second refrigerant evaporator, water does not splash or drop from the second refrigerant evaporator onto the PTC heater, which can prevent the PTC heater from being damaged due to water, thus allowing the PTC heater to be safely operated.

Preferably, the above vehicle air-conditioning system further comprises a second expansion-valve bypass circuit that is connected to the exhaust-heat recovery circuit so as to bypass the second expansion valve and that is provided with an open/close valve; a first connecting circuit that is connected to the exhaust-heat recovery circuit and the heat pump cycle so as to communicate between the outlet side of the second refrigerant evaporator and the inlet side of the first refrigerant condenser and that is provided with a third expansion valve; and a second connecting circuit that is connected to the heat pump cycle so as to communicate between the outlet side of the first refrigerant condenser and the inlet side of the refrigerant compressor.

With this configuration, the second refrigerant evaporator can be defrosted during the heating operation of the vehicle air-conditioning system by opening the open/close valve. In this case, the refrigerant circulates in a channel starting from the refrigerant compressor, passing via the second refrigerant condenser in the HVAC unit, the open valve, the second refrigerant evaporator, the third expansion valve, the first refrigerant condenser, and back to the refrigerant compressor. Here, since the open/close valve opens the second expansion-valve bypass circuit, the refrigerant bypasses the second expansion valve and passes through the second expansion-valve bypass circuit. Accordingly, the refrigerant is not reduced in pressure in front of and behind the open/close valve, and the liquid refrigerant that has passed through the open/close valve flows at an intermediate temperature into the second refrigerant evaporator. With this intermediate-temperature liquid refrigerant, the second refrigerant evaporator can be defrosted.

The refrigerant that has passed through the second refrigerant evaporator is reduced in pressure by the third expansion valve provided in the first connecting circuit into a low-pressure liquid refrigerant and reaches the first refrigerant condenser. This low-pressure liquid refrigerant absorbs heat by heat exchange with the outside air while passing through the first refrigerant condenser into a low-pressure gas refrigerant and is taken into the refrigerant compressor. In other words, the first refrigerant condenser functions as an evaporator while the second refrigerant evaporator is being defrosted. Furthermore, the low-pressure gas refrigerant is compressed by the refrigerant compressor into a high-temperature, high-pressure gas refrigerant and is condensed into liquid by radiating heat to the vehicle interior air with the second refrigerant condenser. This intermediate-temperature liquid refrigerant again flows into the second refrigerant evaporator through the open/close valve.

Thus, the second refrigerant evaporator can be defrosted while the heating operation of the vehicle air-conditioning system is continued.

Furthermore, in the vehicle air-conditioning system of the present invention, preferably, a humidity sensor is provided in the vehicle interior, and wherein a heating operation is performed such that, when window fogging is detected by the humidity sensor during the heating operation in a recirculation air intake mode or an outside and inside air intake mixing mode, the mode is switched to an outside-air intake mode, and the exhaust-heat recovery circuit is operated to recover ventilation exhaust heat with the second refrigerant evaporator.

With this configuration, a humidity sensor is provided in the vehicle interior, and a heating operation is performed such that, when window fogging is detected by the humidity sensor during the heating operation in a recirculation air intake mode or an outside and inside air intake mixing mode, the mode is switched to an outside-air intake mode, and the exhaust-heat recovery circuit is operated to recover ventilation exhaust heat with the second refrigerant evaporator. Therefore, when window fogging is sensed by the humidity sensor, the window fogging can be quickly removed by performing a heating operation while switching the mode to the outside-air intake mode while ensuring the necessary heating capacity by exhaust heat recovery. Accordingly, the problems of window fogging etc. when switching between cooling/heating can also be solved.

Furthermore, in the vehicle air-conditioning system of the present invention, preferably, the first expansion valve and the second expansion valve are thermostatic automatic expansion valves with solenoid open/close valves, in which solenoid open/close valves are integrated.

With this configuration, since the first expansion valve and the second expansion valve are thermostatic automatic expansion valves with solenoid open/close valves, in which the solenoid open/close valves are integrated, a refrigerant circuit that is not in use is closed by the solenoid open/close valve, and for a refrigerant circuit in use, the degree of heating of the refrigerant at the outlet of the evaporator can be controlled to a constant level by using the thermostatic automatic expansion valve whose degree of opening is automatically adjusted by sensing the refrigerant temperature and pressure at the outlet of the evaporator, depending on which of the first refrigerant evaporator and the second refrigerant evaporator is used. Accordingly, this can simplify the configuration and reduce the cost as compared with a system using an electronic expansion valve that needs evaporator-outlet refrigerant-pressure detection means and evaporator-outlet refrigerant-temperature detection means.

Furthermore, in the vehicle air-conditioning system of the present invention, preferably, the heat pump cycle is equipped with a receiver for accumulating a liquid refrigerant condensed by the first refrigerant condenser and the second refrigerant condenser, and the receiver includes backflow preventing devices integrally incorporated therein at the individual refrigerant intake ports of the first refrigerant condenser and the second refrigerant condenser.

With this configuration, since the heat pump cycle is equipped with a receiver for accumulating a liquid refrigerant condensed by the first refrigerant condenser and the second refrigerant condenser, and backflow preventing devices are integrally incorporated at the individual refrigerant intake ports of the receiver for the first refrigerant condenser and the second refrigerant condenser, a refrigerant circuit that is not in use can be shut off via the backflow preventing devices (check valve) incorporated in the refrigerant intake port of the receiver, depending on the operation mode. Accordingly, this eliminates the need for connecting components, such as a flange, as compared with a system in which receivers and the check valves are individually provided in the refrigerant circuits, thus making the system compact and reducing the cost.

Advantageous Effects of Invention

According to the present invention, for cooling, a cooling operation can be performed using a cooling cycle in which the first refrigerant condenser is used as a condenser, and the first refrigerant evaporator of the HVAC unit is used as an evaporator; in a situation where a dehumidifying operation is needed, such as intermediate seasons, a dehumidifying operation can be performed using a dehumidifying cycle in which the second refrigerant condenser of the HVAC unit is used as a condenser, and the first refrigerant evaporator is used as an evaporator; and for heating, a high-efficiency, high-capacity heating operation using ventilation exhaust heat as a heat source can be performed using a heating cycle in which the second refrigerant condenser of the HVAC unit is used as a condenser, and the second refrigerant evaporator for recovering exhaust heat disposed in the ventilation channel is used as an evaporator. Accordingly, this can simplify the circuit configuration and considerably reduce the number of components to make the system compact as compared with a system equipped with an exhaust heat recovery cycle in a separate system, thus improving the ease of installation in vehicles and reducing the cost. Furthermore, unlike a heat pump that absorbs heat from outside air, the need for a defrosting operation of the first refrigerant condenser disposed outside the vehicle interior at a low outside air temperature can be nearly eliminated, which can increase the heating efficiency and prevent an operation using the evaporator installed outside the vehicle interior, which stabilizes the evaporation action of the evaporator, thus eliminating the need to install an accumulator and intake-refrigerant pressure detecting means, which makes the system compact and achieves a low cost. Furthermore, in a situation where a dehumidifying operation is needed, such as in intermediate seasons, a dehumidifying operation using the heat pump cycle can also be achieved.

DESCRIPTION OF EMBODIMENTS

Embodiments of the present invention will be described hereinbelow with reference to the drawings.

First Embodiment

A first embodiment of the present invention will be described hereinbelow using FIG. 1.

Figure 1:
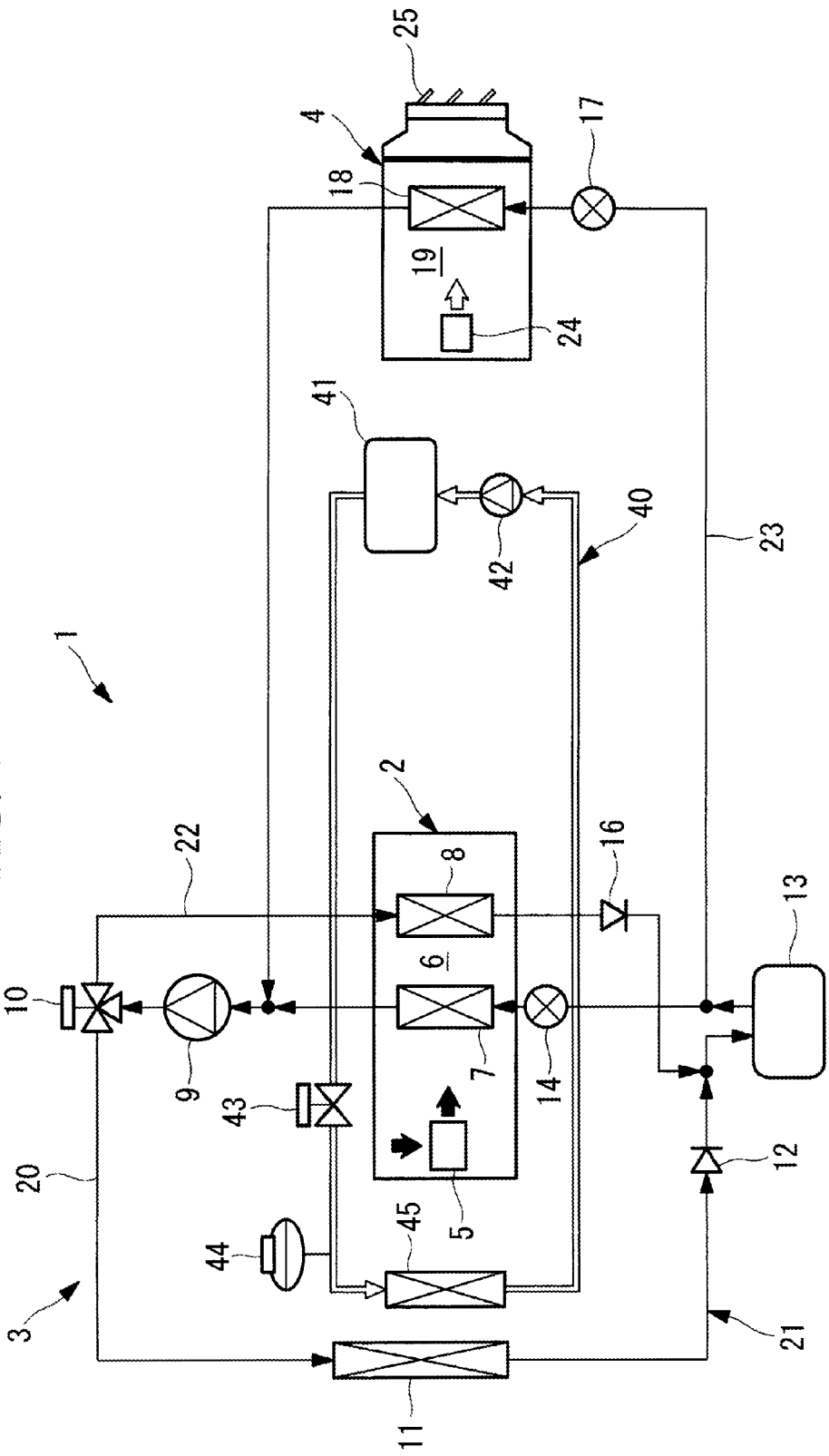
FIG. 1 is a configuration diagram of a vehicle air-conditioning system according to a first embodiment of the present invention.

FIG. 1 shows a configuration diagram of a vehicle air-conditioning system 1 according to a first embodiment of the present invention.

The vehicle air-conditioning system 1 of this embodiment is equipped with a heating ventilation and air conditioning unit (HVAC unit) 2, a heat pump cycle 3, and a ventilation-exhaust-heat recovery unit 4.

The HVAC unit 2 includes a blower 5 that introduces inside air from a vehicle interior, outside air, or a mixture of inside air and outside air by switching to any one of these and blows it downstream and a first refrigerant evaporator 7 and a second refrigerant condenser 8 which are disposed in sequence from the upstream side to the downstream side in an air channel 6 that continues from the blower 5. This HVAC unit 2 is generally disposed in an instrument panel at the front of the vehicle interior and is configured to blow out an airflow whose temperature is controlled by the first refrigerant evaporator 7 and the second refrigerant condenser 8 into the vehicle interior through a plurality of vents that are open to the vehicle interior in accordance with any selected blowing mode to control the vehicle interior to a set temperature.

The ventilation-exhaust-heat recovery unit 4 includes a ventilation channel 19 that discharges vehicle interior air outside the vehicle and a second refrigerant evaporator 18 disposed in the ventilation channel 19. The ventilation channel 19 is provided with a fan 24 and is provided with an in-vehicle pressure regulating valve (PRV: pressure relief valve) 25 at the outlet thereof, where the PRV 25 is automatically opened when the pressure in the vehicle interior reaches a set pressure or higher or when the fan 24 is driven.

The heat pump cycle 3 is constituted by a refrigerant compressor 9, a refrigerant switching device 10 for switching a refrigerant circulating direction, a first refrigerant condenser 11 that condenses the refrigerant by exchanging heat with the outside air, a check valve 12, a receiver 13 that stores the condensed liquid refrigerant, a first expansion valve (with electronic expansion valve) 14 that adiabatically expands the refrigerant, the first refrigerant evaporator 7 and the second refrigerant condenser 8 provided in the HVAC unit 2, a check valve 16, a second expansion valve (with electronic expansion valve) 17 that adiabatically expands the refrigerant, and a second refrigerant evaporator 18 disposed in the ventilation channel 19 through which vehicle interior air is discharged outside the vehicle.

This heat pump cycle 3 has a closed-cycle refrigerant circuit 21 configured such that the refrigerant compressor 9, the refrigerant switching device 10, the first refrigerant condenser 11, the check valve 12, the receiver 13, the first expansion valve 14, and the first refrigerant evaporator 7, described above, are connected by a refrigerant pipe 20, and a parallel circuit 22 equipped with the second refrigerant condenser 8 and the check valve 16 is connected in parallel with the first refrigerant condenser 11 and the check valve 12 in the refrigerant circuit 21 via the refrigerant switching device 10.

The heat pump cycle 3 is configured such that an exhaust-heat recovery circuit 23 equipped with the second refrigerant evaporator 18 disposed in the ventilation channel 19 from the vehicle interior and the second expansion valve 17 is connected in parallel with the first expansion valve 14 and the first refrigerant evaporator 7 so that exhaust heat can be recovered from ventilation air discharged from the vehicle interior.

Electric vehicles are provided with a motor cooling circuit 40 that cools a driving motor (which may include an inverter and a battery) 41, in addition to the vehicle air-conditioning system 1. The motor cooling circuit 40 is a circuit in which a cooling pump 42, a driving motor 41, a solenoid valve 43, a reserve tank 44, and a radiator 45 are connected in this order.

With the configuration described above, this embodiment offers the following operational advantages.

In the above vehicle air-conditioning system 1, in the cooling operation, for example, during the summer, the refrigerant compressed by the refrigerant compressor 9 is circulated to the first refrigerant condenser 11 via the refrigerant switching device 10 to exchange heat with the outside air so that it is condensed into liquid. This liquid refrigerant is guided to the first expansion valve 14 through the check valve 12 and the receiver 13 and is reduced in pressure into a gas-liquid two-phase state, which is then supplied to the first refrigerant evaporator 7. Here, the refrigerant evaporated due to heat exchange with the inside air, the outside air, or the mixture of inside air and outside air blown from the blower 5 is taken into the refrigerant compressor 9 and is compressed again. On the other hand, the inside air, the outside air, or the mixture of inside air and outside air cooled by heat exchange with the refrigerant is blown into the vehicle interior for cooling Under a situation where a dehumidifying operation is needed, such as intermediate seasons (for example, spring and autumn), the refrigerant compressed by the refrigerant compressor 9 is circulated in the parallel circuit 22 via the refrigerant switching device 10 where it radiates heat in the second refrigerant condenser 8 and is condensed into liquid. This liquid refrigerant is guided to the first expansion valve 14 through the check valve 16 and the receiver 13, is reduced in pressure into a gas/liquid two-phase state, and is supplied to the first refrigerant evaporator 7. Thus, in the HVAC unit 2, the inside air, the outside air, or the mixture of inside air and outside air blown from the blower 5 is first cooled by heat exchange with the refrigerant in the first refrigerant evaporator 7 and is then heated by heat radiated from the second refrigerant condenser 8 at the downstream side and is blown into the vehicle interior. At that time, adjusting the amount of heating in the second refrigerant condenser 8 to form temperature-regulated air at a set temperature allows a dehumidifying operation to be achieved by the heat pump cycle 3.

Furthermore, in the heating operation, such as in the winter, the refrigerant compressed by the refrigerant compressor 9 is circulated in the parallel circuit 22 via the refrigerant switching device 10 and is condensed into liquid due to heat radiation in the second refrigerant condenser 8. This refrigerant is guided to the second expansion valve 17 via the check valve 16, the receiver 13, and the exhaust-heat recovery circuit 23, is reduced in pressure into a gas/liquid two-phase state, which is then supplied to the second refrigerant evaporator 18 provided in the ventilation channel 19. In the second refrigerant evaporator 18, the vehicle interior air ventilated by the fan 24 and the refrigerant are subjected to heat exchange, where the refrigerant absorbs heat from the ventilated air, thus being evaporated, and is thereafter taken into the refrigerant compressor 9, where it is compressed again. During this process, the inside air, the outside air, or the mixture of inside air and outside air blown from the blower 5 is heated by the heat radiated from the second refrigerant condenser 8 and is then blown out into the vehicle interior for heating.

Thus, by recovering the exhaust heat from the ventilated vehicle interior air, heat-pump heating can be performed. Therefore, this embodiment allows a high-efficiency, high-capacity heating operation in which ventilation exhaust heat is recovered using a heating cycle in which the second refrigerant evaporator 18 for recovering exhaust heat provided in the ventilation channel 19 is used as an evaporator.

Accordingly, this can simplify the circuit configuration and considerably reduce the number of components, making the system compact as compared with a system equipped with an exhaust heat recovery cycle in a separate system, thus improving the ease of installation in vehicles and reducing the cost.

Unlike a heat pump that absorbs heat from outside air, even at a low outside air temperature, since the air that passes through the ventilation channel 19 from the vehicle interior is heated to a temperature higher than the outside air by the heating operation with the heat pump or, for example, by PTC heaters 26, 27, and 29, the second refrigerant evaporator 18 seldom becomes frosted, which nearly completely eliminates the need for a defrosting operation, thus eliminating interruption of the heating operation due to the defrosting operation, which allows a continuous, stable heating operation, thus improving the heating efficiency, and which also prevents an operation using the evaporator installed outside the vehicle interior, which stabilizes the evaporation action of the evaporator, thus eliminating the need to install an accumulator and intake-refrigerant pressure detecting means, which makes the system compact and reduces the cost.

Furthermore, under a situation where a dehumidifying operation is needed, such as in intermediate seasons, using the second refrigerant condenser 8 of the heat pump cycle 3 as a condenser and the first refrigerant evaporator 7 as an evaporator allows also the dehumidifying operation to be realized.

The check valve 12 provided between the first refrigerant condenser 11 and the receiver 13 may be replaced with an open/close valve. In the heating operation of the vehicle air-conditioning system 1, although the first refrigerant condenser 11 is not used, when the check valve 12 is not under pressure, the check valve 12 sometimes does not properly operate. In this case, there is a possibility that the refrigerant flows from the parallel circuit 22 back to the first refrigerant condenser 11, and the liquid refrigerant accumulates in the first refrigerant condenser 11. By replacing the check valve 12 with an open/close valve and closing the open/close valve in the heating operation of the vehicle air-conditioning system 1, such a phenomenon can be avoided.

Second Embodiment

Next, a second embodiment of the present invention will be described using FIG. 2.

A vehicle air-conditioning system 1A of this embodiment differs from the foregoing vehicle air-conditioning system 1 of the first embodiment in that PTC heaters 26 and 27 and a humidity sensor 28 are provided. Since the other features are the same as those of the vehicle air-conditioning system 1 of the first embodiment, descriptions thereof will be omitted.

Figure 2:
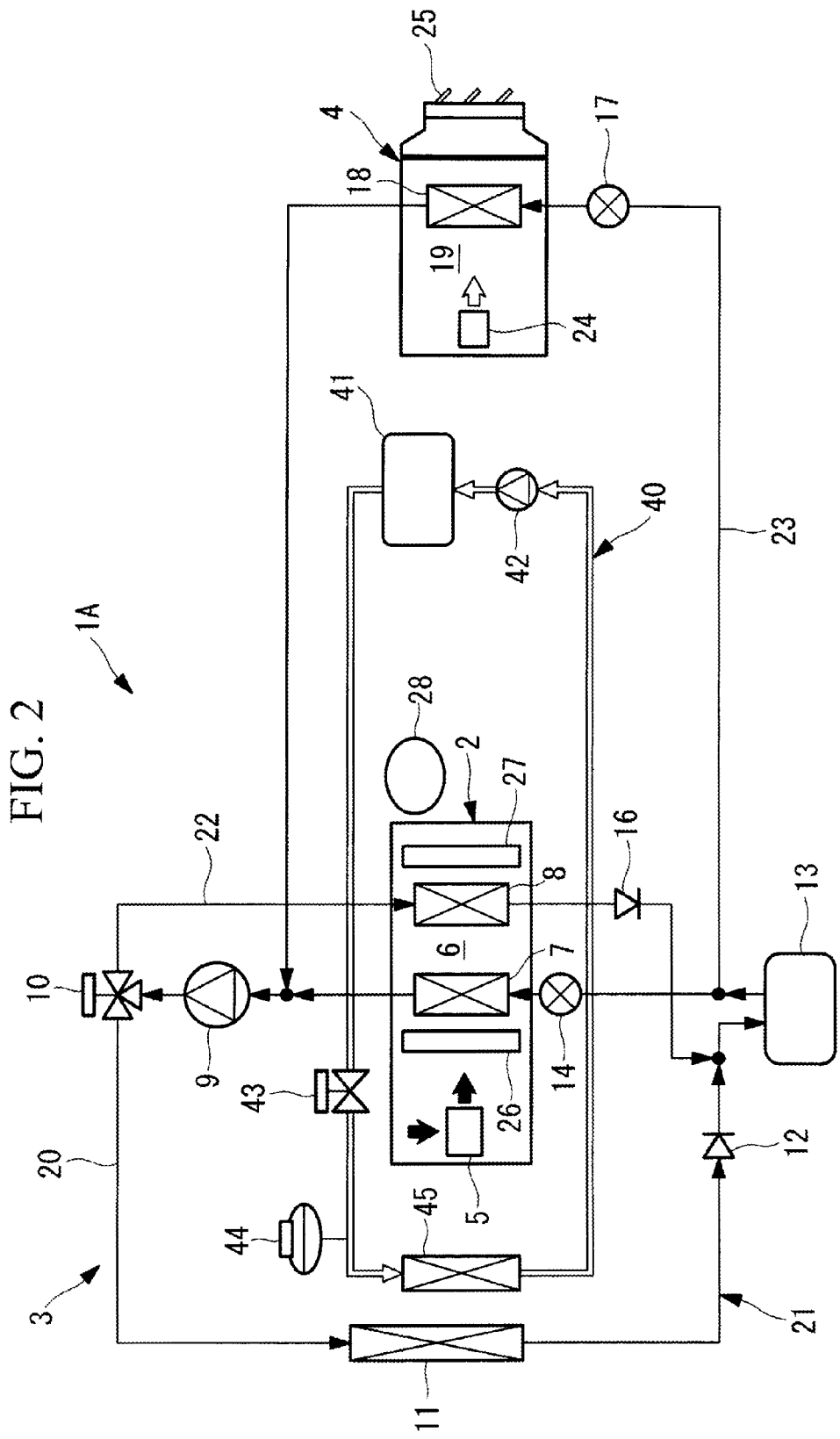
FIG. 2 is a configuration diagram of a vehicle air-conditioning system according to a second embodiment of the present invention.

In the vehicle air-conditioning system 1A of this embodiment, as shown in FIG. 2, the HVAC unit 2 is configured such that the PTC heater (Positive Temperature Coefficient Heater) 26 is disposed upstream of the refrigerant evaporator 7 and the PTC heater 27 is disposed downstream of the second refrigerant condenser 8 in the air channel 6. Furthermore, the humidity sensor 28 is provided in the vehicle interior for sensing window fogging.

As described above, by disposing the PTC heaters 26 and 27 in the air channel 6 of the HVAC unit 2, when the temperature in the vehicle interior is low, at a low outside temperature or at the start of heating, so that exhaust heat cannot be recovered from ventilation air, or under a situation in which the heating capacity is insufficient, such as when the windows are fogged, the PTC heaters 26 and 27 are temporarily operated at the same time as the heat pump is operated to increase the temperature of the blown-out air, thereby compensating for the shortage of the heating capacity. This allows the necessary maximum heating capacity to be sufficiently ensured and high-efficiency operation to be achieved, by reducing the degree of utilization of the PTC heaters 26 and 27 as compared with the heating operation by using an electric heater as the main heat source, thereby preventing a decrease in vehicle driving mileage due to an increase in the power consumption for heating.

Particularly at the start Of heating, the temperature of the vehicle interior is low, and thus exhaust heat recovery from the ventilation air cannot be expected. However, by operating the PTC heaters 26 and 27 and starting a heating operation in a recirculation air intake mode or an outside and inside air intake mixing mode, heating can be immediately started even at a low outside air temperature, and the insufficient capacity can be compensated for to ensure the necessary heating capacity. Accordingly, the heating operation can be started immediately irrespective of the outside air temperature, and the blowing air temperature can be increased at an early stage by using the recirculation air intake mode or the outside and inside air intake mixing mode to improve the warm-up performance in heating.

Furthermore, the humidity sensor 28 for sensing Window fogging is provided in the vehicle interior, so that when window fogging is sensed by the humidity sensor 28 in the heating operation with the recirculation air intake mode or the outside and inside air intake mixing mode, the heating operation can be achieved such that air introduction by the blower 5 is switched to an outside-air intake mode, and the refrigerant is allowed to flow through the exhaust-heat recovery circuit 23 to recover the ventilation exhaust heat using the second refrigerant evaporator 18. Therefore, when window fogging is sensed, the window fogging can be quickly removed by performing a heating operation while switching the mode to the outside-air intake mode while ensuring the necessary heating capacity by means of exhaust heat recovery. Accordingly, the problems of window fogging etc. when switching between cooling/heating can also be solved.

Although this embodiment is configured such that the PTC heaters 26 and 27 are provided upstream of the first refrigerant evaporator 7 and downstream of the second refrigerant condenser 8, respectively, only one of the PTC heaters 26 and 27 may be provided. The PTC heater 27 provided downstream of the second refrigerant condenser 8 may be configured to be modularized to form a single unit together with the second refrigerant condenser 8.

Third Embodiment

Next, a third embodiment of the present invention will be described using FIG. 3.

A vehicle air-conditioning system 1B of this embodiment differs from the vehicle air-conditioning systems 1 and 1A of the foregoing first and second embodiments in that the PTC heater 29 is provided in the ventilation channel 19. Since the other features are the same as those of the vehicle air-conditioning systems 1 and 1A of the first and second embodiments, descriptions thereof will be omitted.

Figure 3:
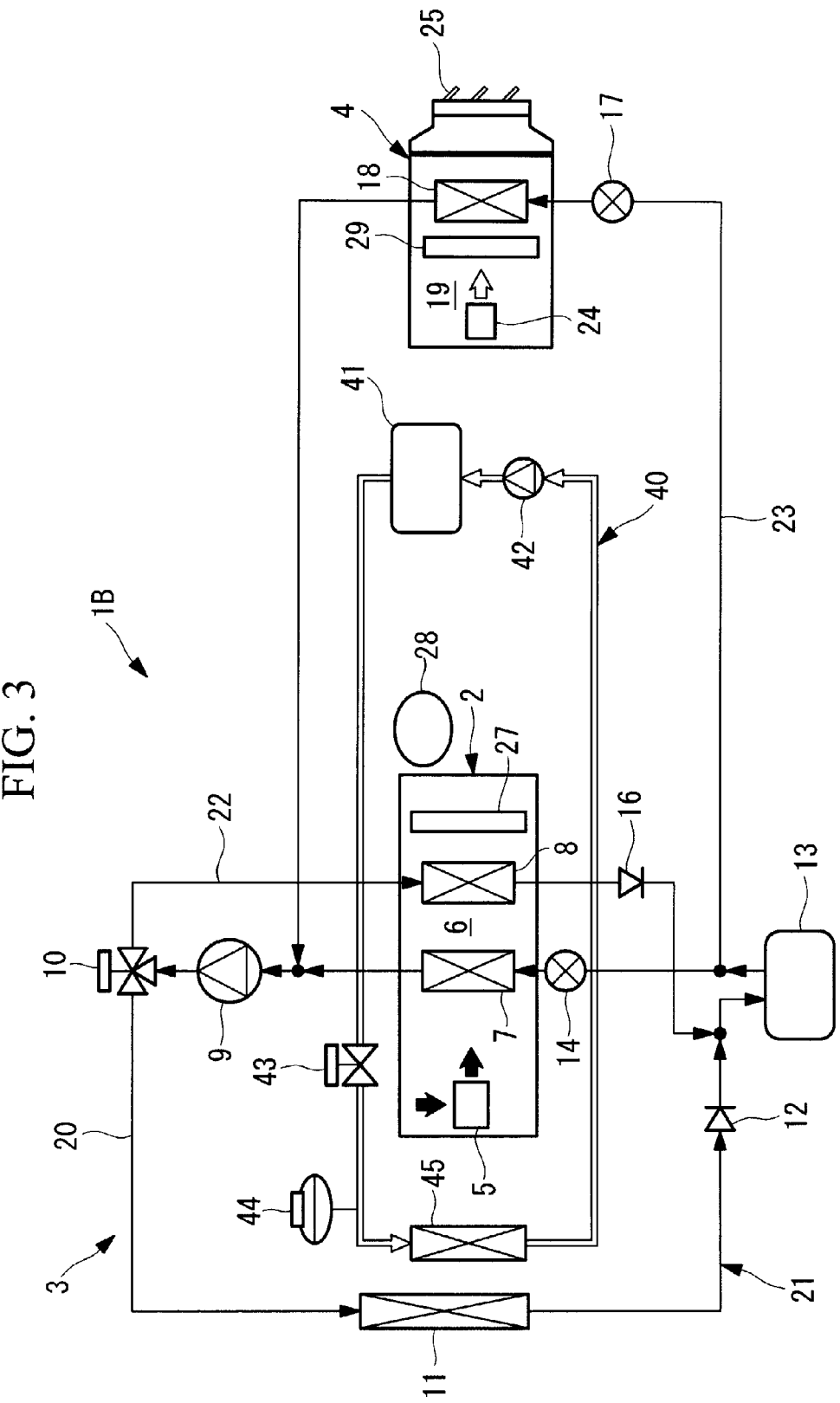
FIG. 3 is a configuration diagram of a vehicle air-conditioning system according to a third embodiment of the present invention.

As shown in FIG. 3, the vehicle air-conditioning system 1B of this embodiment is configured such that the PTC heater 29 is provided upstream of the second refrigerant evaporator 18 in the ventilation channel 19 of the ventilation-exhaust-heat recovery unit 4. This embodiment is the same as the second embodiment in that the PTC heater 27 is provided downstream of the second refrigerant condenser 8 in the HVAC unit 2, and the humidity sensor 28 for sensing window fogging is provided in the vehicle interior.

As described above, with the configuration in which the PTC heater 29 is provided upstream of the second refrigerant evaporator 18 in the ventilation channel 19, even if the temperature of the vehicle interior is low at the start of heating and thus exhaust heat cannot be recovered from the ventilation air, a high-capacity, high-efficiency heating operation can be achieved immediately by means of the heating cycle in which the second refrigerant evaporator 18 in the ventilation channel 19 is used as an evaporator and the second refrigerant condenser 8 in the HVAC unit 2 is used as a condenser by activating the PTC heater 29 and driving the refrigerant compressor 9 at the same time.

Accordingly, also with this embodiment, the heating operation can be started immediately irrespective of the outside air temperature, thus improving the warm-up performance in heating. In this case, using the PTC heater 26 and/or 27 provided in the HVAC unit 2 together can further increase the heating effect. However, the concurrent use of the PTC heaters 26 and 27 is not essential here. Furthermore, when window fogging is sensed by the humidity sensor 28, the window fogging can be removed more effectively by switching the mode to the outside-air intake mode and using an exhaust-heat recovery heating cycle in which the PTC heater 29 is activated.

Fourth Embodiment

Next, a fourth embodiment of the present invention will be described using FIG. 4.

A vehicle air-conditioning system 1C of this embodiment differs from the vehicle air-conditioning system 1B of the third embodiment in that frost sensors (temperature sensors) 30 and 31 and an open/close valve 15 are provided. Since the other features are the same as those of the vehicle air-conditioning system 1B of the third embodiment, descriptions thereof will be omitted.

Figure 4:
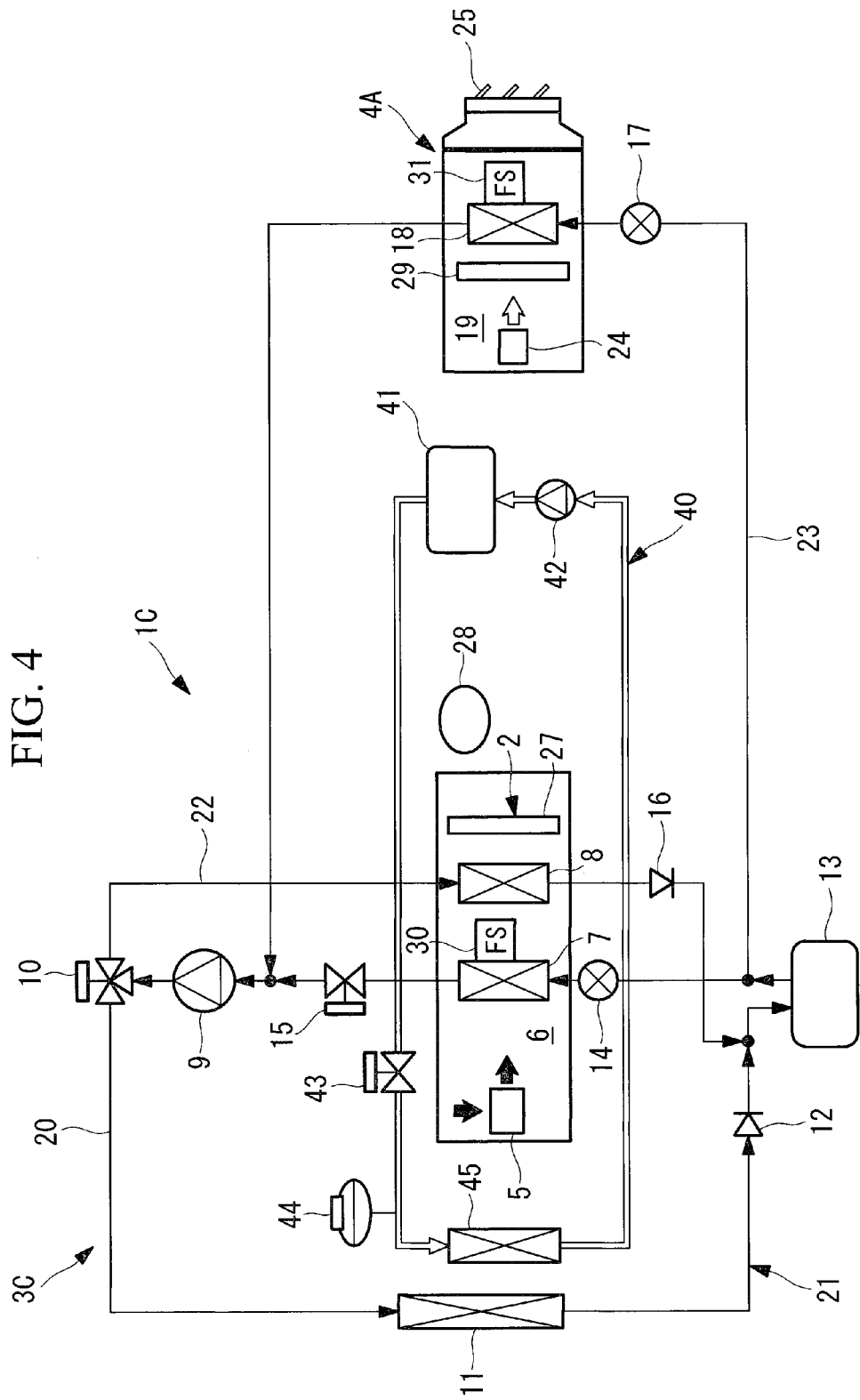
FIG. 4 is a configuration diagram of a vehicle air-conditioning system according to a fourth embodiment of the present invention.

In the vehicle air-conditioning system 1C of this embodiment, as shown in FIG. 4, the frost sensor 30 is disposed on the first refrigerant evaporator 7 provided in the HVAC unit 2, and the frost sensor 31 is disposed on the second refrigerant evaporator 18 provided in the ventilation-exhaust-heat recovery unit 4A. These frost sensors 30 and 31 are directly mounted on the fins of the first refrigerant evaporator 7 and the second refrigerant evaporator 18, respectively, and detect the temperatures of the fins of the first refrigerant evaporator 7 and the second refrigerant evaporator 18. Instead of this configuration, the frost sensors 30 and 31 may be disposed on the sides of the first refrigerant evaporator 7 and the second refrigerant evaporator 18, respectively, to detect the blowing air temperatures of air that has passed through the first refrigerant evaporator 7 and the second refrigerant evaporator 18.

Furthermore, as shown in FIG. 4, the open/close valve 15 is provided at the outlet side of the first refrigerant evaporator 7, that is, at the refrigerant compressor 9 side of the first refrigerant evaporator 7.

Figure 5:
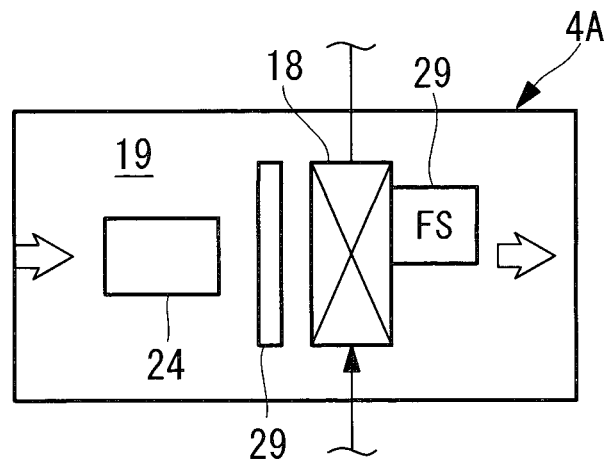
FIG. 5 is an enlarged diagram showing the arrangement of a second PTC heater and a second refrigerant evaporator in the vehicle air-conditioning system according to the fourth embodiment of the present invention.

FIG. 5 shows an enlarged view of the ventilation-exhaust-heat recovery unit 4A. As shown in FIG. 5, the PTC heater 29 is provided between the second refrigerant evaporator 18 and the fan 24 in the ventilation channel 19 in the ventilation-exhaust-heat recovery unit 4A, that is, upstream of the second refrigerant evaporator 18. Furthermore, the PTC heater 29 is disposed away from a location vertically below the second refrigerant evaporator 18. Specifically, the PTC heater 29 and the second refrigerant evaporator 18 are disposed in the vertical direction so as to be substantially parallel to each other.

Figure 6:
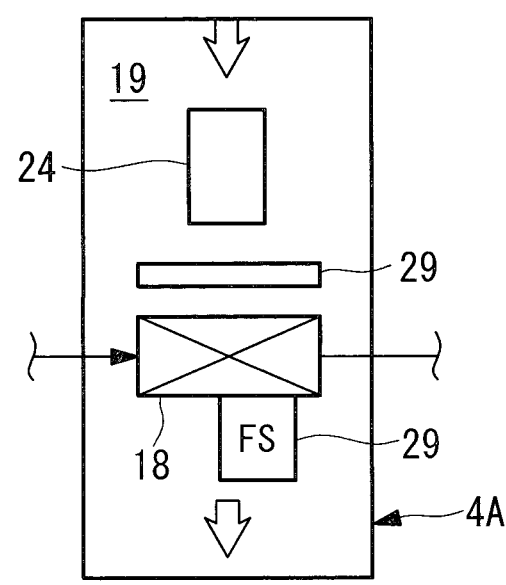
FIG. 6 is an enlarged diagram showing a modification of the arrangement of the second PTC heater and the second refrigerant evaporator in the vehicle air-conditioning system according to the fourth embodiment of the present invention.

Alternatively, instead of this configuration, as shown in FIG. 6, for example, the PTC heater 29 may be disposed upstream of the second refrigerant evaporator 18 and vertically above the second refrigerant evaporator 18 in the ventilation channel 19 in the ventilation-exhaust-heat recovery unit 4A.

In the case where the heating operation of the vehicle air-conditioning system 1C is started at a low outside air temperature, it is determined that the temperature of air blown from the air channel 5 in the HVAC unit 2 is low and the heating capacity is insufficient; therefore, obtaining the necessary heating capacity requires increasing the rotational speed of the refrigerant compressor 9. In this case, if the temperature of the vehicle interior is relatively low, and heat sources using the PTC heaters 27 and 29 are insufficient, the second refrigerant evaporator 18 is prone to frosting (the second refrigerant evaporator 18 is prone to frosting), which results in the refrigerant compressor 9 being operated in the vicinity of a low-pressure limit.

In the case where the temperature of the fins of the second refrigerant evaporator 18 or the blowing air temperature of air that has passed through the second refrigerant evaporator 18 detected by the frost sensor 31 is lower than a predetermined temperature, the occurrence of frosting of the second refrigerant evaporator 18 is predicted. In this case, there is a possibility that the pressure at the low pressure side of the refrigerant compressor 9 decrease, causing a high-compressor operation or liquid slugging operation in the refrigerant compressor 9, thus damaging the refrigerant compressor 9. To prevent this, the output of the PTC heater 29 disposed upstream of the second refrigerant evaporator 18 in the ventilation channel 19 is increased to prevent frosting of the second refrigerant evaporator 18. Here, the output of the PTC heater 29 is set as low as possible within a range in which the temperature of the fins of the second refrigerant evaporator 18 or the blowing air temperature of air that has passed through the second refrigerant evaporator 18 detected by the frost sensor 31 does not fall below a predetermined temperature, that is, in the range in which frosting of the second refrigerant evaporator 18 can be prevented.

This control can prevent frosting of the second refrigerant evaporator 18 using the second PTC heater 29 while ensuring the necessary heating capacity without decreasing the rotational speed of the refrigerant compressor 9 to maintain the evaporation of the refrigerant in the second refrigerant evaporator 18, thereby reliably preventing high-compression-ratio operation or liquid slugging operation of the refrigerant compressor 9. Since the output of the PTC heater 29 can be as low as possible in the range in which frosting of the second refrigerant evaporator 18 can be prevented, the power consumption for heating can be reduced relative to the battery capacity of the vehicle, and thus, a decrease in the driving mileage of the vehicle can be reduced as much as possible.

On the other hand, even if the temperature of the fins of the second refrigerant evaporator 18 or the blowing air temperature of air that has passed through the second refrigerant evaporator 18 detected by the frost sensor 31 is lower than a predetermined temperature, the rotational speed of the refrigerant compressor 9 is decreased without increasing the output of the PTC heater 29 provided that the temperature of air blown from the air channel 5 in the HVAC unit 2 is high enough, and thus, it is determined that the heating capacity is sufficient. This control can further reduce the power consumption for heating relative to the battery capacity, thus minimizing a decrease in the driving mileage of the vehicle.

During the cooling operation of the vehicle air-conditioning system 1C, the refrigerant circulates not through the second refrigerant evaporator 18 but through the first refrigerant evaporator 7. Thus, when the temperature of the fins of the first refrigerant evaporator 7 or the blowing air temperature of air that has passed through the first refrigerant evaporator 7 detected by the frost sensor 30 mounted on the first refrigerant evaporator 7 is lower than a predetermined temperature during the cooling operation, the rotational speed of the refrigerant compressor 9 is decreased to protect the refrigerant compressor 9 from experiencing damage.

Furthermore, as described above, the PTC heater 29 is provided between the second refrigerant evaporator 18 and the fan 24 in the ventilation channel 19 in the ventilation-exhaust-heat recovery unit 4A, that is, upstream of the second refrigerant evaporator 18. Furthermore, the PTC heater 29 is disposed away from a location vertically below the second refrigerant evaporator 18. Accordingly, even if condensation or frost occurs in the second refrigerant evaporator 18, water does not splash or drop from the second refrigerant evaporator 18 onto the PTC heater 29, which can prevent the PTC heater 29 from being damaged by water, thus allowing the PTC heater 29 to be safely operated.

Furthermore, as described above, the open/close valve 15 is provided at the outlet side of the first refrigerant evaporator 7, that is, at the refrigerant compressor 9 side of the first refrigerant evaporator 7. Without the open/close valve 15, any liquid refrigerant that remains unevaporated by the second refrigerant evaporator 18 at a low outside air temperature may flow back to the first refrigerant evaporator 7 on the way from the exhaust-heat recovery circuit 23 to the refrigerant compressor 9 and may accumulate in the first refrigerant evaporator 7, causing the risk of a low-gas operation in which there is insufficient refrigerant flowing in the heat pump cycle 3. In this embodiment, by closing the open/close valve 15 during the heating operation of the vehicle air-conditioning system 1C, a low-gas operation in which a liquid refrigerant accumulates in the first refrigerant evaporator 7 can be avoided.

Modifications of Fourth Embodiment

In the vehicle air-conditioning system 1C of the fourth embodiment, the frost sensor 31 is disposed on the second refrigerant evaporator 18 provided in the ventilation-exhaust-heat recovery unit 4A. Alternatively, instead of the frost sensor 31 disposed on the second refrigerant evaporator 18, a low-pressure sensor (not shown) for detecting the pressure at the low-pressure side of the refrigerant compressor 9 may be provided.

With this configuration, if the pressure at the low pressure side of the refrigerant compressor 9 detected by the low-pressure sensor is lower than a predetermined pressure, high-compression-ratio operation or liquid slugging operation may occur in the refrigerant compressor 9, thus damaging the refrigerant compressor 9. To prevent this, the output of the PTC heater 29 disposed upstream of the second refrigerant evaporator 18 in the ventilation channel 19 is increased to promote evaporation of the refrigerant in the second refrigerant evaporator 18. Here, the output of the PTC heater 29 is set as low as possible within the range in which the pressure at the low-pressure side of the refrigerant compressor 9 detected by the low-pressure sensor does not fall below a predetermined pressure, that is, in the range in which frosting of the second refrigerant evaporator 18 can be prevented.

On the other hand, even if the pressure at the low pressure side of the refrigerant compressor 9 detected by the low-pressure sensor is lower than a predetermined pressure, the rotational speed of the refrigerant compressor 9 is decreased without increasing the output of the PTC heater 29 provided that the temperature of air blown from the air channel 5 in the HVAC unit 2 is high enough and it is determined that the heating capacity is sufficient.

Furthermore, in addition to the frost sensor 31 disposed on the second refrigerant evaporator 18, the low-pressure sensor (not shown) for detecting the pressure at the low-pressure side of the refrigerant compressor 9 may be provided, and the frost sensor 31 and the low-pressure sensor may be used together.

In this case, when at least one of two conditions is satisfied, namely, the condition that the temperature of the fins of the second refrigerant evaporator 18 or the blowing air temperature of air that has passed through the second refrigerant evaporator 18 detected by the frost sensor 31 be lower than a predetermined temperature and the condition that the pressure at the low-pressure side of the refrigerant compressor 9 detected by the low-pressure sensor be lower than a predetermined pressure, the output of the PTC heater 29 is increased or the rotational speed of the refrigerant compressor 9 is decreased.

Also with the configurations of these modifications, the same advantages as those of the vehicle air-conditioning system 1D of the fourth embodiment can be provided.

Fifth Embodiment

Figure 7:
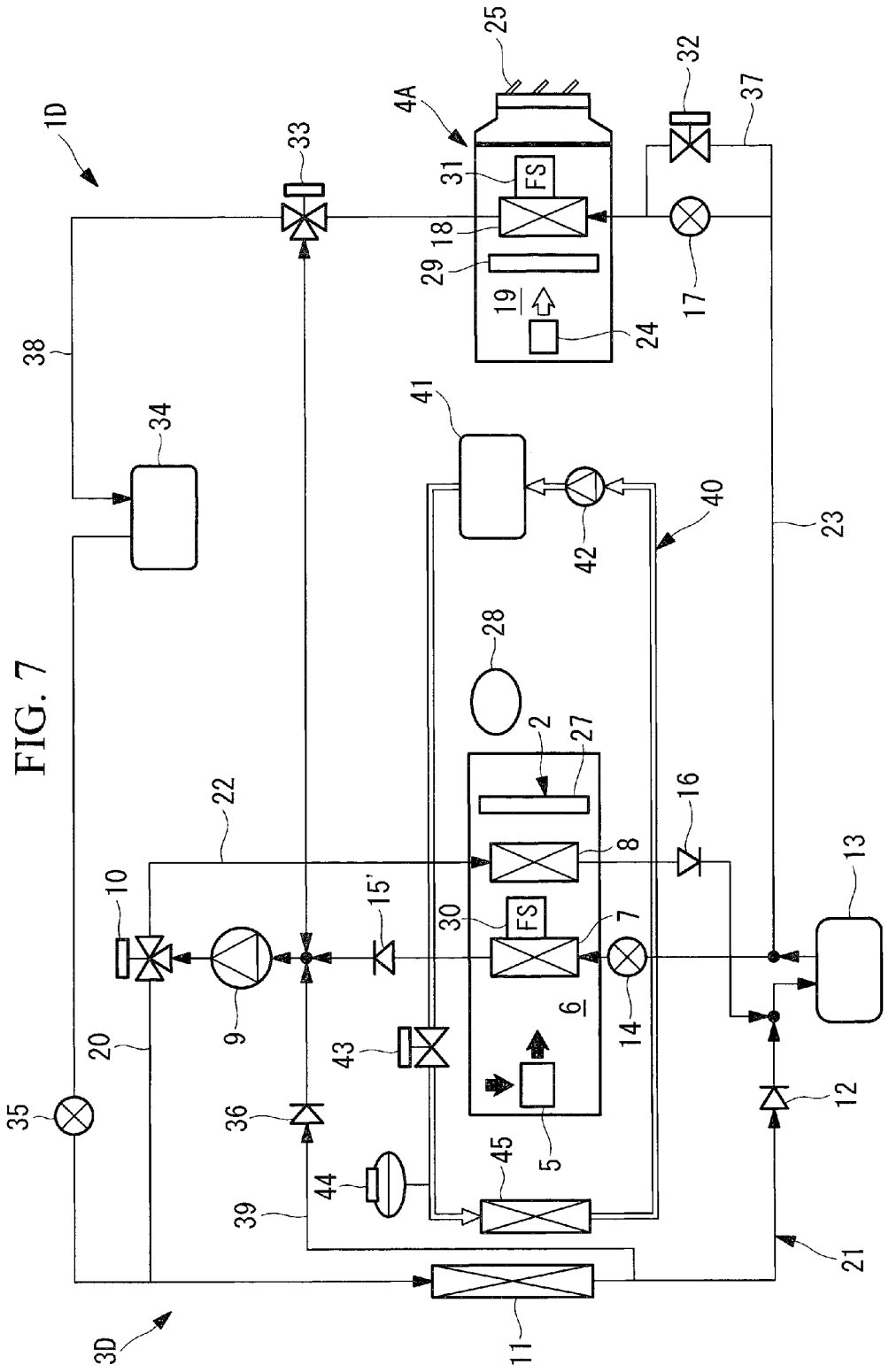
FIG. 7 is a configuration diagram of a vehicle air-conditioning system according to a fifth embodiment of the present invention.

Next, a fifth embodiment of the present invention will be described using FIG. 7.

A vehicle air-conditioning system 1D of this embodiment differs from the vehicle air-conditioning system 1C of the fourth embodiment described above in that a second expansion-valve bypass circuit 37, a first connecting circuit 38, and a second connecting circuit 39 are added. Since the other features are the same as those of the vehicle air-conditioning system 1C of the fourth embodiment, descriptions thereof will be omitted.

The second expansion-valve bypass circuit 37 is connected to the exhaust-heat recovery circuit 23 so as to bypass the second expansion valve 17. The second expansion-valve bypass circuit 37 is provided with an open/close valve 32 thereon.

The first connecting circuit 38 is connected to the exhaust-heat recovery circuit 23 and the refrigerant circuit 21 so as to communicate between the outlet side of the second refrigerant evaporator 18 and the inlet side of the first refrigerant condenser 11. The first connecting circuit 38 is provided with a receiver 34 and a third expansion valve 35 therein. The first connecting circuit 38 is provided with a three-way valve 33 at a branch point from the exhaust-heat recovery circuit 23.

The second connecting circuit 39 is connected to the refrigerant circuit 21 so as to communicate between the outlet side of the first refrigerant condenser 11 and the inlet side of the refrigerant compressor 9. The second connecting circuit 39 is provided with a check valve 36 therein.

With this configuration, by opening the open/close valve 32 and opening the three-way valve 33 to the first connecting circuit 38 during the heating operation of the vehicle air-conditioning system 1D, the second refrigerant evaporator 18 can be defrosted.

Specifically, by opening the open/close valve 32 and opening the three-way valve 33 to the first connecting circuit 38, the refrigerant circulates in a channel starting from the refrigerant compressor 9 via the second refrigerant condenser 8 in the HVAC unit 2, the check valve 16, the receiver 13, the open/close valve 32, the second refrigerant evaporator 18, the three-way valve 33, the receiver 34, the third expansion valve 35, and the first refrigerant condenser 11 back to the refrigerant compressor 9.

At that time, since the open/close valve 32 opens the second expansion-valve bypass circuit 17, the refrigerant bypasses the second expansion valve 17 and passes through the second expansion-valve bypass circuit 37. Accordingly, the refrigerant is not reduced in pressure in front of and behind the open/close valve 32, and the liquid refrigerant that has passed through the open/close valve 32 flows at an intermediate temperature into the second refrigerant evaporator 18. With this intermediate-temperature liquid refrigerant, the second refrigerant evaporator 18 can be defrosted.

The refrigerant that has passed through the second refrigerant evaporator 18 is temporarily received by the receiver 34, is thereafter reduced in pressure by the third expansion valve 35 provided in the first connecting circuit 38 into a low-pressure liquid refrigerant, and reaches the first refrigerant condenser 11. This low-pressure liquid refrigerant absorbs heat by heat exchange with the outside air while passing through the first refrigerant condenser 11 to become a low-pressure gas refrigerant and is taken into the refrigerant compressor 9 via the check valve 16. In other words, the first refrigerant condenser 11 functions as an evaporator while the second refrigerant evaporator 18 is being defrosted. The low-pressure gas refrigerant is compressed by the refrigerant compressor 9 into a high-temperature, high-pressure gas refrigerant and is condensed into liquid by radiating heat to the vehicle interior air with the second refrigerant condenser 8. This intermediate-temperature liquid refrigerant again flows into the second refrigerant evaporator through the open valve.

Thus, the second refrigerant evaporator 18 can be defrosted while the heating operation of the vehicle air-conditioning system 1D is being continued.

Sixth Embodiment

Next, a sixth embodiment of the present invention will be described using FIG. 8.

This embodiment differs from the foregoing first to fifth embodiments in the configurations of the first expansion valve and the second expansion valve. Since the other features are the same as those of the first to fifth embodiments, descriptions thereof will be omitted.

Figure 8:
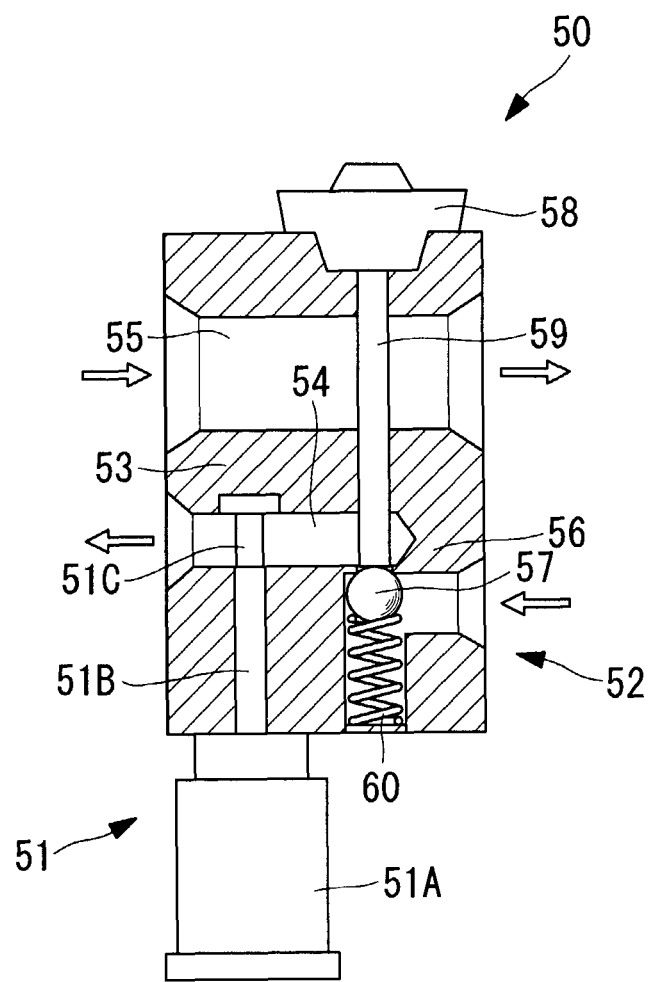
FIG. 8 is a configuration diagram of a vehicle air-conditioning system according to a sixth embodiment of the present invention.

Although the first to fifth embodiments use electronic expansion valves as the first expansion valve 14 and the second expansion valve 17, this embodiment is configured to use thermostatic automatic expansion valves 50 with solenoid open/close valves, in which solenoid open/close valves 51 are integrated, instead of the electronic expansion valves, as shown in FIG. 8.

These thermostatic automatic expansion valves 50 with the solenoid open/close valves are disposed at the refrigerant circuit inlets of the first refrigerant evaporator 7 and the second refrigerant evaporator 18 and are each configured such that a valve main body 53 provided with an inlet-side refrigerant channel 54 and an outlet-side refrigerant channel 55 for the evaporators, the solenoid open/close valve 51 that opens/closes the inlet-side refrigerant channel 54 provided in the valve main body 53, and a thermostatic automatic expansion valve 52 which is seated on a valve seat 56 provided in the inlet-side refrigerant channel 54 and which is equipped with a ball valve 57 that adjusts the degree of opening thereof are integrated.

The solenoid open/close valve 51 includes an electromagnetic coil 51A, a moving iron core 51B, and a valve element 51C provided at the end of the moving iron core 51B for opening/closing the inlet-side refrigerant channel 54 and is configured such that the moving iron core 51B moves forward and backward in the axial direction when the electromagnetic coil 51A is energized to cause the valve element 51C to open/close the inlet-side refrigerant channel 54. The thermostatic automatic expansion valve 52 is configured to sense the temperature and pressure of the refrigerant in the outlet-side refrigerant channel 55, through which the refrigerant evaporated by the first refrigerant evaporator 7 or the second refrigerant evaporator 18 circulates, with a temperature-sensitive cylinder and a diaphragm 58 and moves a shaft 59 forward and backward using the pressure difference to push the ball valve 57 with a spring 60 so that the degree of opening is adjusted.

The use of the above thermostatic automatic expansion valves 50 with the solenoid open/close valve allows the refrigerant to be automatically controlled by the thermostatic automatic expansion valve 52, during operation in a cycle using either the first refrigerant evaporator 7 or the second refrigerant evaporator 18, so that the degree of heating of the refrigerant at the outlet of the first refrigerant evaporator 7 or the second refrigerant evaporator 18 is kept constant by opening the solenoid open/close valve 51 to supply the refrigerant, which is adiabatically expanded by the thermostatic automatic expansion valve 52, via the inlet side refrigerant channel 54. Accordingly, this can simplify the configuration and reduce the cost as compared with a system using an electronic expansion valve, which needs refrigerant-pressure detection means and refrigerant-temperature detection means.

Seventh Embodiment

Figure 9A:
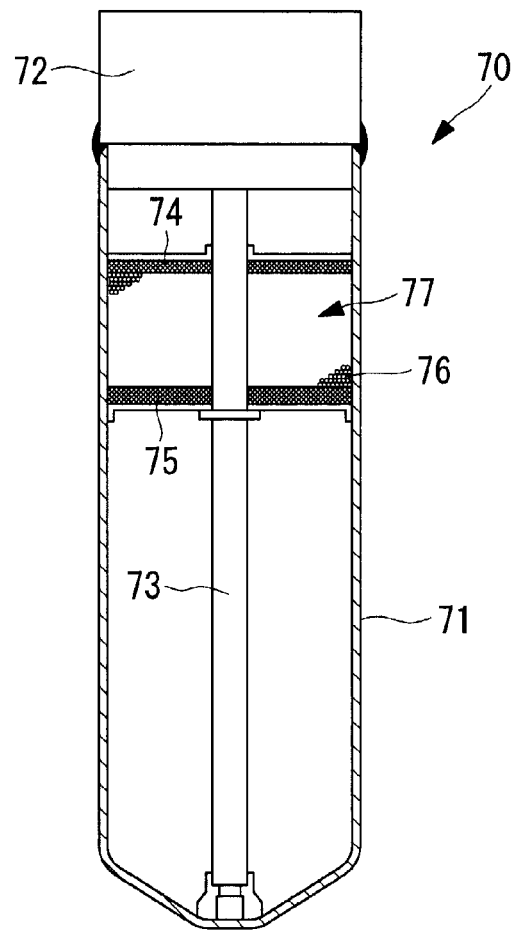
FIG. 9A is a longitudinal sectional view of a receiver for use in a vehicle air-conditioning system according to a seventh embodiment of the present invention.
Figure 9B:
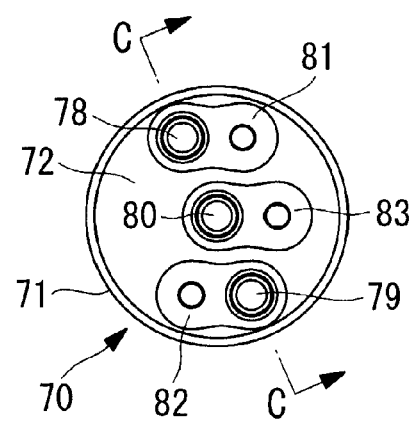
FIG. 9B is a plan view of the receiver for use in the vehicle air-conditioning system according to the seventh embodiment of the present invention.
Figure 9C:
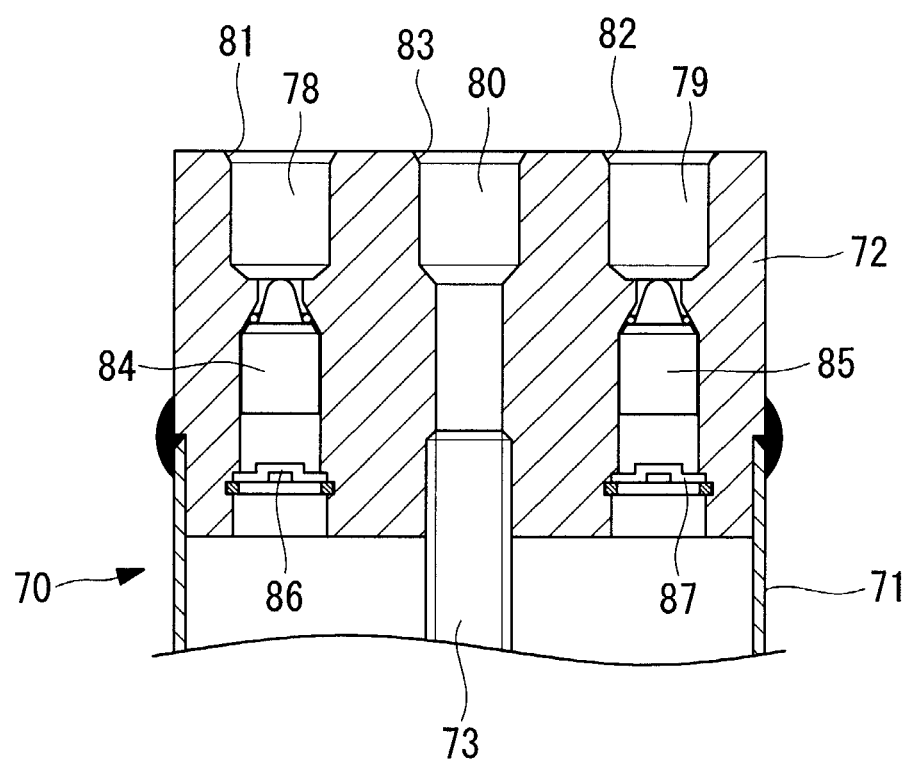
FIG. 9C is an enlarged cross-sectional view taken along C-C of the receiver shown in FIG. 9B.

Next, a seventh embodiment of the present invention will be described using FIGS. 9A to 9C.

This embodiment differs from the foregoing first to fifth embodiments in the configuration of a receiver 70. Since the other features are the same as those of the first to fifth embodiments, descriptions thereof will be omitted.

The receiver 70 of this embodiment is an alternative to the receiver 13 of the first to fifth embodiments and is configured such that the check valves 12 and 16 provided in the refrigerant circuits on the inlet side of the receiver 13 are integrally incorporated therein.

The receiver 70 is a receiver with a dryer constituted by a cylindrical main body 71 having a bottom, a cap 72 welded to an opening at one end of the main body 71, a refrigerant discharge pipe 73 one end of which is connected to the cap 72 and the other end of which is extended to the vicinity of the bottom of the main body 71, and a dryer 77 configured by filling the space between a pair of upper and lower filters 74 and 75 disposed at an upper part in the main body 71 with a desiccant 76.

The cap 72 has two refrigerant intake ports 78 and 79 to which refrigerant pipes from the first refrigerant condenser 11 and the second refrigerant condenser 8 are connected, respectively, and a refrigerant discharge port 80 to which the refrigerant discharge pipe 73 is connected. The refrigerant intake ports 78 and 79 and the refrigerant discharge port 80 are provided with fitting portions 81, 82, and 83 for connecting the refrigerant pipes, respectively. The refrigerant intake ports 78 and 79 accommodate check valves (backflow preventing devices) 84 and 85 which are incorporated via snap rings and stoppers 86 and 87, respectively.

By using the receiver 70 with a dryer in which the check valves 84 and 85 are integrally incorporated at the refrigerant intake ports 78 and 79, respectively, as a receiver, as described above, allows the refrigerant circuit from the first refrigerant condenser 11 and the second refrigerant condenser 8, which are not used depending on the operation mode, can be shut off by the check valve 84 or 85 installed at the refrigerant intake port 78 or 79 of the receiver 70. Accordingly, this eliminates the need for connecting components, such as a flange, as compared with a system in which the receivers and the check valves are individually provided in the refrigerant circuits, thus making the system more compact and reducing the cost.

The receiver 70 is not necessarily provided with the dryer 77.

The present invention is not limited to the invention according to the above embodiments, and appropriate modifications may be made without departing from the spirit thereof. For example, the HVAC unit 2 may be an air mix HVAC provided with a temperature-controlling air mix damper downstream of the first refrigerant evaporator 6. Furthermore, the three-way switching valve that constitutes the refrigerant switching device 10 in the heat pump cycle 3 may be replaced with two solenoid valves or a four-way switching valve. Furthermore, the cooling medium in the motor cooling circuit 40 may be cooled by the vehicle air-conditioning system 1, or 1A to 1D, as necessary.

In the above embodiments, although a description is given of examples in which the electronic expansion valves and the thermostatic automatic expansion valve 50 with a solenoid open/close valve are used as the first expansion valve 14 and the second expansion valve 17, it is needless to say that the present invention also encompasses a system configured such that a general solenoid open/close valve and a thermostatic automatic expansion valve are individually connected in series.

REFERENCE SIGNS LIST 1 vehicle air-conditioning system
2 HVAC unit
3 heat pump cycle
6 air channel
7 first refrigerant evaporator
8 second refrigerant condenser
9 refrigerant compressor
10 refrigerant switching device
11 first refrigerant condenser
14 first expansion valve
17 second expansion valve
18 second refrigerant evaporator
19 ventilation channel
22 parallel circuit
23 exhaust-heat recovery circuit
26, 27 first PTC heater
28 humidity sensor
29 second PTC heater
30, 31 temperature sensor
32 open/close valve
35 third expansion valve
37 second expansion-valve bypass circuit
38 first connecting circuit
39 second connecting circuit
50 thermostatic automatic expansion valve with solenoid open/close valve
51 solenoid open/close valve
52 thermostatic automatic expansion valve
70 receiver
78, 79 refrigerant intake port
84, 85 check valve (backflow preventing devices)

The invention claimed is:
1. A vehicle air-conditioning system comprising:
an HVAC unit disposed at the front of the vehicle and configured to include a first refrigerant evaporator and a second refrigerant condenser disposed in an air chan- nel communicating with a vehicle interior space and to blow out an airflow whose temperature is controlled by the first refrigerant evaporator and the second refrigerant condenser and a heat pump cycle in which a refrigerant compressor, a refrigerant switching device for switching the circulating direction of a refrigerant, a first refrigerant condenser that condenses the refrigerant by exchanging heat with outside air, a first expansion valve, and the first refrigerant evaporator are connected in this order and in which the second refrigerant condenser is connected in parallel with the first refrigerant condenser via the refrigerant switching device, wherein, the heat pump cycle includes, an exhaust-heat recovery circuit, equipped with a second refrigerant evaporator disposed in a ventilation channel from the vehicle interior for recovering exhaust heat and a second expansion valve, being connected in parallel with the first expansion valve and the first refrigerant evaporator, wherein a temperature sensor configured to detect the surface temperature of the second refrigerant evaporator or the blowing air temperature of air that has passed through the second refrigerant evaporator is provided, and when the temperature detected by the temperature sensor falls below a predetermined, the rotational speed of the refrigerant compressor is decreased, a second expansion-valve bypass circuit that is connected to the exhaust-heat recovery circuit so as to bypass the second expansion valve and that is provided with an open/close valve;

a first connecting circuit that is connected to the exhaust-heat recovery circuit and the heat pump cycle so as to communicate between the outlet side of the second refrigerant evaporator and the inlet side of the first refrigerant condenser and that is provided with a third expansion valve; and a second connecting circuit that is connected to the heat pump cycle so as to communicate between the outlet side of the first refrigerant condenser and the inlet side of the refrigerant compressor, and wherein the refrigerant from the second refrigerant evaporator is supplied to the first refrigerant condenser via the third expansion valve provided in the first connecting circuit.

2. The vehicle air-conditioning system according to claim 1, wherein a first PTC heater for heating air is provided in the air channel upstream of the first refrigerant evaporator and/or downstream of the second refrigerant condenser of the HVAC unit.

3. The vehicle air-conditioning system according to claim 2, wherein, at the start of heating, the first PTC heater is operated to start a heating operation in a recirculation air intake mode or an outside and inside air intake mixing mode.

4. The vehicle air-conditioning system according to claim 1, wherein a second PTC heater for heating air is provided upstream of the second refrigerant evaporator in the ventilation channel.

5. The vehicle air-conditioning system according to claim 4, wherein, at the start of heating, the second PTC heater is operated to start a heating operation in a recirculation air intake mode or an outside and inside air intake mixing mode.

6. The vehicle air-conditioning system according to claim 4, wherein, when the temperature detected by the temperature sensor falls below a predetermined temperature, the output of the second PTC heater is increased.

7. The vehicle air-conditioning system according to claim 6, wherein the output of the second PTC heater is set to a minimum required output so that the temperature detected by the temperature sensor does not fall below the predetermined temperature.

8. The vehicle air-conditioning system according to claim 4, further comprising:

a low-pressure sensor for detecting the pressure at the low pressure side of the refrigerant compressor, wherein, when the pressure detected by the low-pressure sensor falls below a predetermined pressure, the output of the second PTC heater is increased, or the rotational speed of the refrigerant compressor is decreased.

9. The vehicle air-conditioning system according to claim 8, wherein the output of the second PTC heater is set to a minimum required output so that the pressure detected by the low-pressure sensor does not fall below the predetermined pressure.

10. The vehicle air-conditioning system according to claim 4, wherein the second PTC heater is disposed away from a location vertically below the second refrigerant evaporator.

11. The vehicle air-conditioning system according to claim 1, wherein a humidity sensor is provided in the vehicle interior, and wherein a heating operation is performed such that, when window fogging is detected by the humidity sensor during the heating operation in a recirculation air intake mode or an outside and inside air intake mixing mode, the mode is switched to an outside-air intake mode, and the exhaust-heat recovery circuit is operated to recover ventilation exhaust heat with the second refrigerant evaporator.

12. The vehicle air-conditioning system according to claim 1, wherein the first expansion valve and the second expansion valve are thermostatic automatic expansion valves with solenoid open/close valves, in which solenoid open/close valves are integrated.

13. The vehicle air-conditioning system according to claim 1, wherein the heat pump cycle is equipped with a receiver for accumulating a liquid refrigerant condensed by the first refrigerant condenser and the second refrigerant condenser, and the receiver includes backflow preventing devices integrally incorporated therein at the individual refrigerant intake ports from the first refrigerant condenser and the second refrigerant condenser.

* * * * *